C. A. DAMON.
HEATER.
APPLICATION FILED OCT. 20, 1910.

990,345.

Patented Apr. 25, 1911.

Witnesses:
C. W. Carroll
D. Gurnee.

Inventor:
Charles A. Damon
by Osgood Davis
his attorneys

UNITED STATES PATENT OFFICE.

CHARLES A. DAMON, OF BUFFALO, NEW YORK, ASSIGNOR TO CYPHERS INCUBATOR COMPANY, OF BUFFALO, NEW YORK, A CORPORATION OF NEW YORK.

HEATER.

990,345.  Specification of Letters Patent.  Patented Apr. 25, 1911.

Application filed October 20, 1910. Serial No. 588,228.

*To all whom it may concern:*

Be it known that I, CHARLES A. DAMON, a citizen of the United States, and resident of Buffalo, in the county of Erie and State of New York, have invented certain new and useful Improvements in Heaters, of which the following is a specification.

This invention relates to heaters, and particularly to those that are designed to heat incubators and brooders, and employ a lamp for that purpose.

The object of the invention is to make it impossible to fill the lamp while in its operative position, and also to reduce the fire risk while the lamp is burning and the heater is in operation.

Figure 1:
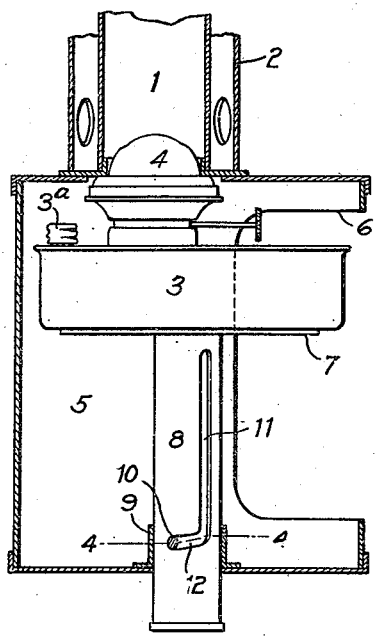
Figure 2:
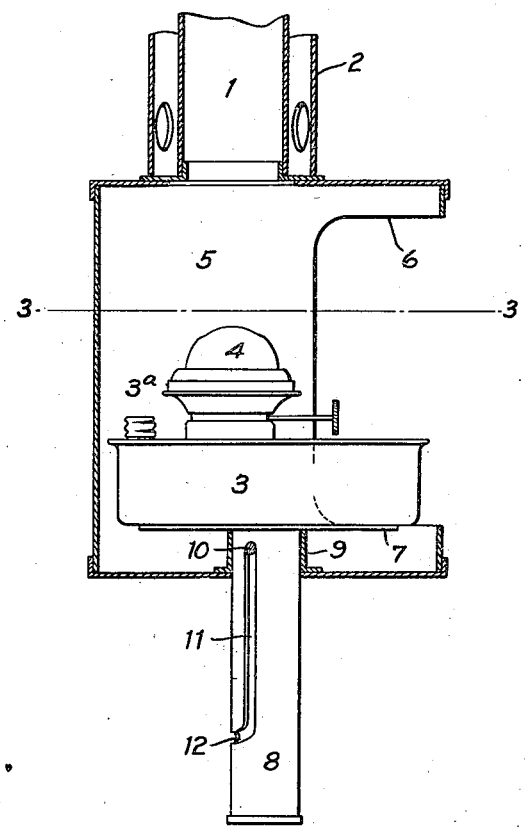
Figure 3:
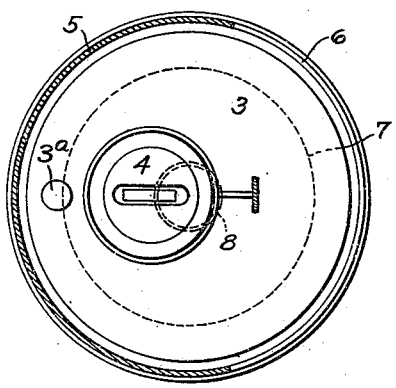
Figure 4:
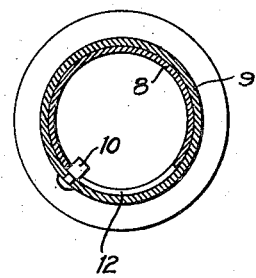

In the drawings:—Figure 1 is a central vertical section of a device embodying the present invention, the lamp and its support being shown in operative position; Fig. 2 is a similar view, but shows the lamp and its support in positions that permit the removal of the lamp; Fig. 3 is a section on the line 3—3 of Fig. 2; and Fig. 4 is an enlarged section on the line 4—4 of Fig. 1.

The illustrated embodiment of the invention comprises a flue 1 through which the heated products of combustion are carried off, and which serves to heat the incubator, or other chamber that is to be heated, either directly or indirectly. In the drawings a method of indirect radiation is indicated by the tube 2 that surrounds the flue 1 and forms around it another flue through which air travels and is heated before entering the chamber.

The heat is supplied by a lamp comprising an oil-font 3 and a burner 4. When the lamp is in operative position (see Fig. 1) its burner 4 enters the lower end of the flue 1, which thus takes the place of a chimney for the lamp. The lamp is inclosed within a lamp-box 5, located below the flue 1, and preferably made of sheet metal or other fireproof material. This lamp-box has a lateral opening 6 so that the lamp can be placed within it, and the lamp-box is adapted to surround the lamp snugly.

The lamp is supported within the lamp-box upon a plate 7 carried on the upper end of a tubular stem 8, the latter being adapted to slide vertically through a centrally-located collar 9 in the bottom of the lamp-box. The stem is provided with means, that will be described later, for locking it in elevated position with the burner of the lamp in the flue 1.

The flue 1 is off-center with respect to the lamp-box in a direction away from the opening 6 through which the lamp is introduced, while the burner 4 of the lamp is correspondingly offset from the center of the lamp and toward the filling-cap. Accordingly, when the lamp is in the position within the lamp-box 5 that will bring the burner 4 directly beneath the draft flue 1, the filling-cap 3ª must necessarily be at the back of the lamp-box, out of reach from the opening 6, and therefore, it is impossible to fill the oil-font while the lamp is in operative position. Obviously, the lamp cannot be turned around within the casing, so as to bring the filling-cap 3ª to the opening 6 in the casing, while the lamp is in its operative position.

It will be noted that, as shown in Fig. 1, when the lamp is in raised position the filling-opening is so close to the top of the lamp-box as to be practically inaccessible whether this filling-opening be close to, or distant from, the lateral opening in the lamp-box. While it is preferable, therefore, to employ the eccentric arrangement of the burner hereinbefore described, it will be obvious that this arrangement is not essential as a preventative of filling the lamp while in operative position, since the arrangement by which the lamp is raised to the top of the box is in itself a device of practical utility in this connection.

A stud 10 on the collar 9 projects inwardly through a slot 11 in the stem 8, the lower end 12 of which is extended nearly at a right angle with its vertical portion, the stud and slot forming a "bayonet catch" for locking the stem in elevated position. The portion 12 of the slot is inclined slightly downward, as shown in Fig. 1, so that as the stem is turned the stud 10 forces the burner 4 up close against the lower end of the flue 1.

I claim—

A heater having, in combination, a lamp-box provided with a lateral opening to receive a lamp; a lamp comprising a burner and an oil-font closely fitting the lamp-box and provided with a filling-opening, the burner being located eccentrically with respect to the oil-font and offset in the direction of the filling-opening; a flue adapted to receive the lamp-burner only when the oil-font is in position in the lamp-box with the filling-opening distant from said lateral opening, and means for raising the lamp in the lamp-box to engage the burner with the bottom of the flue.

CHARLES A. DAMON.

Witnesses:
ELLA M. HOWES,
ROSE C. HOWELL.

Copies of this patent may be obtained for five cents each, by addressing the "Commissioner of Patents Washington, D. C."